Jan. 14, 1958 J. J. GOLICK ET AL 2,819,647
MOTION PICTURE CAMERA
Filed Dec. 2, 1949 12 Sheets-Sheet 1
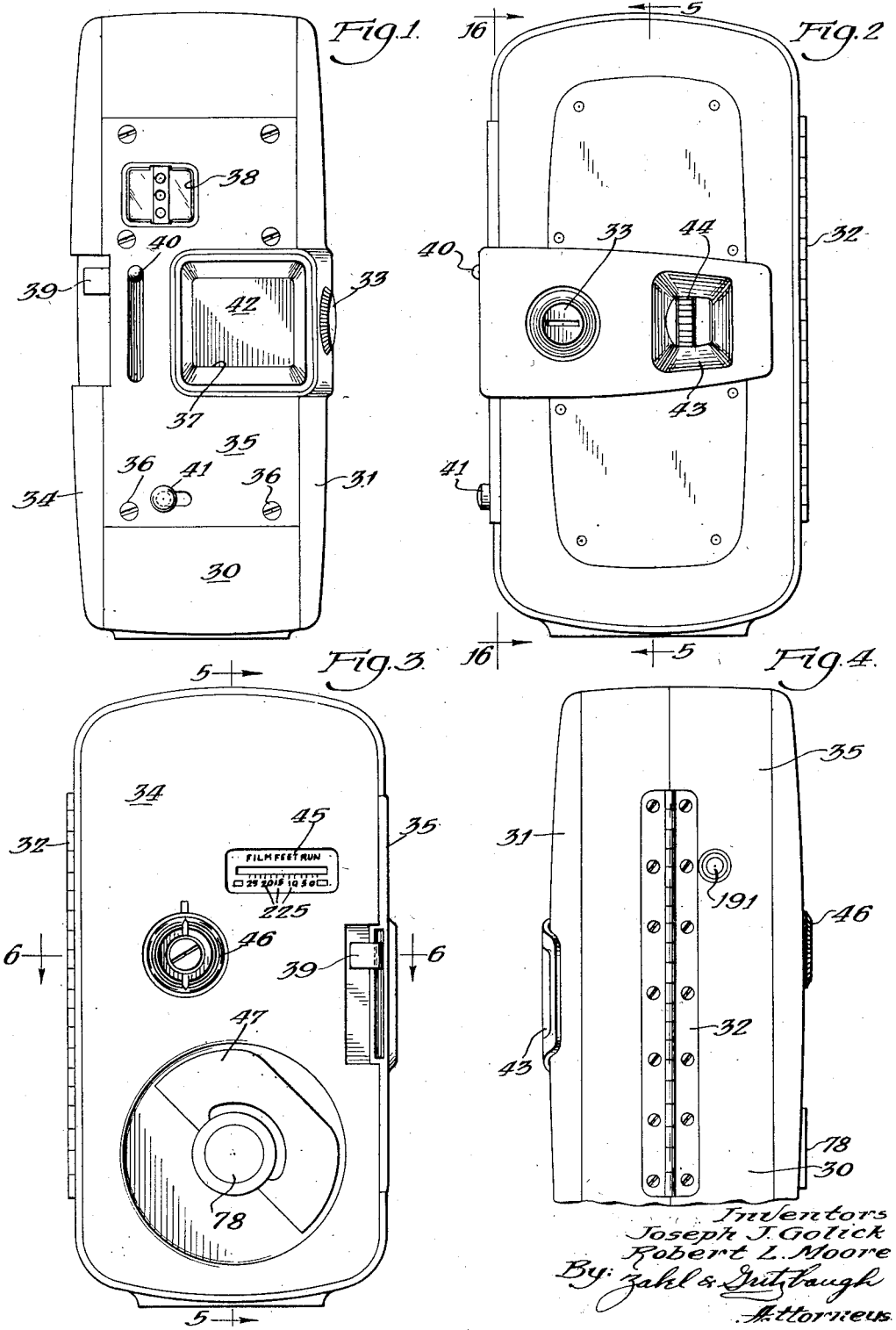
Inventors
Joseph J. Golick
Robert L. Moore
By: Zahl & Gutbaugh
Attorneys

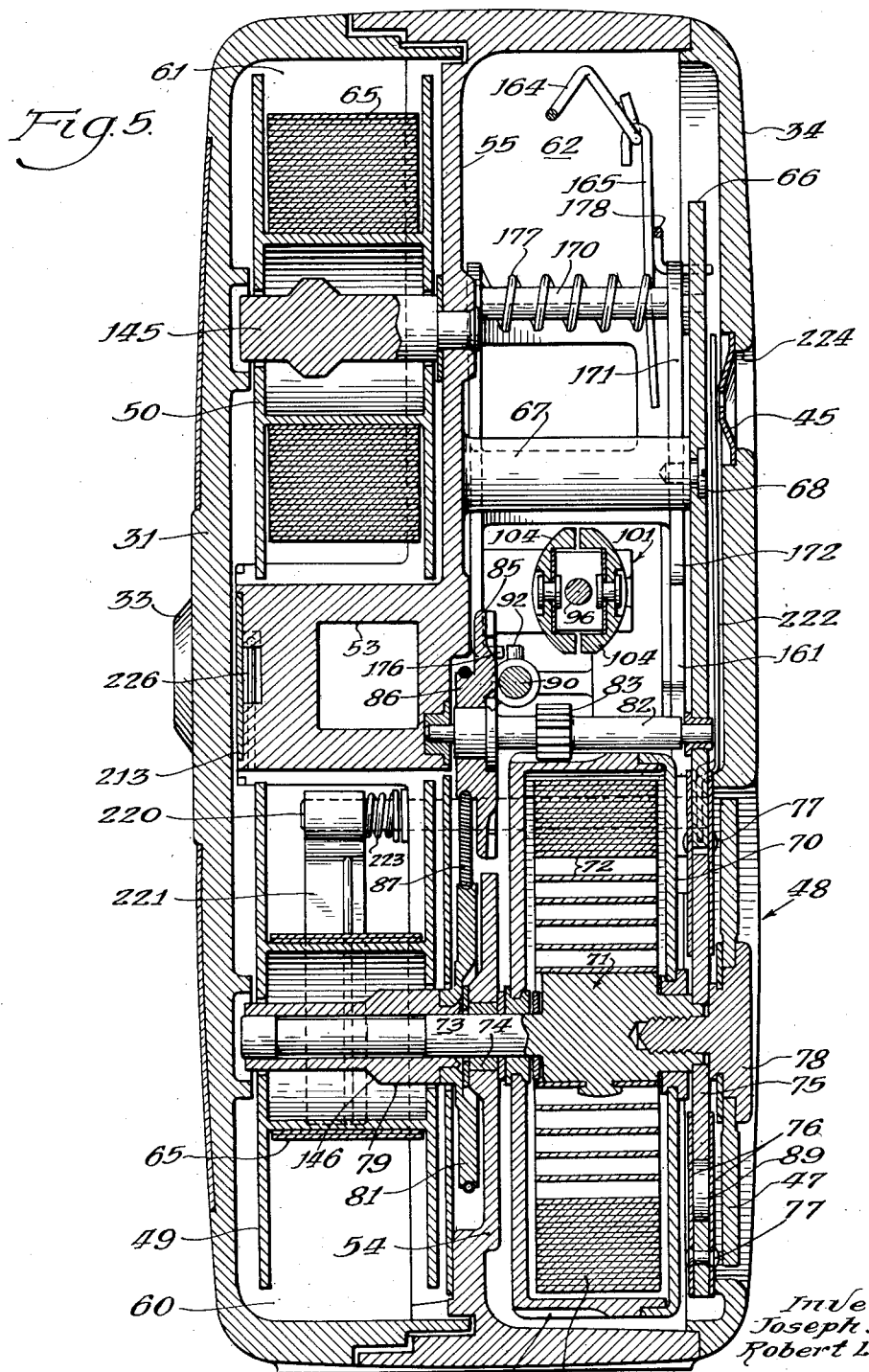

Jan. 14, 1958   J. J. GOLICK ET AL   2,819,647
MOTION PICTURE CAMERA
Filed Dec. 2, 1949   12 Sheets-Sheet 3

Inventors:
Joseph J. Golick
Robert L. Moore
By: Zabel & Gutzbaugh
Attorneys

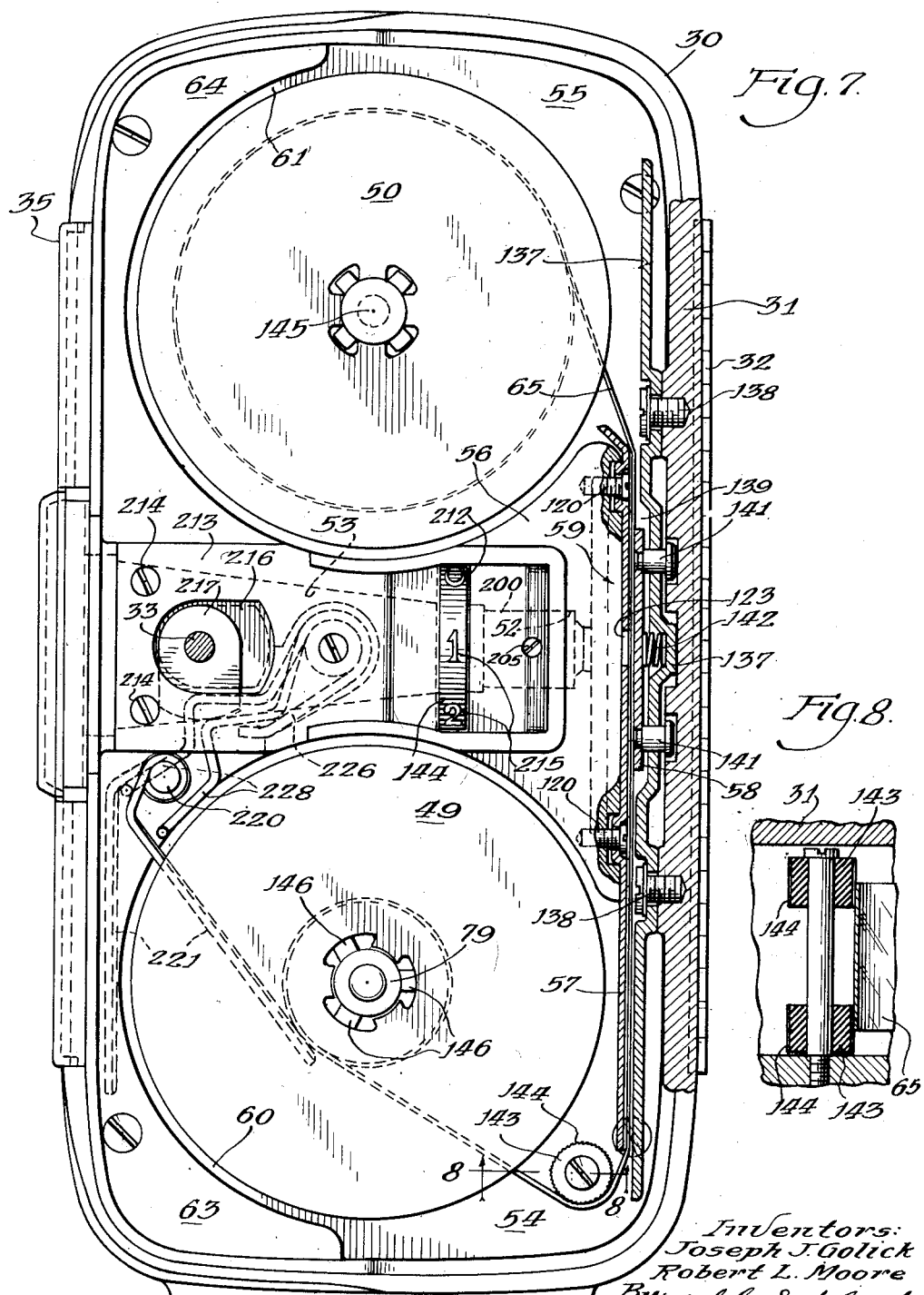

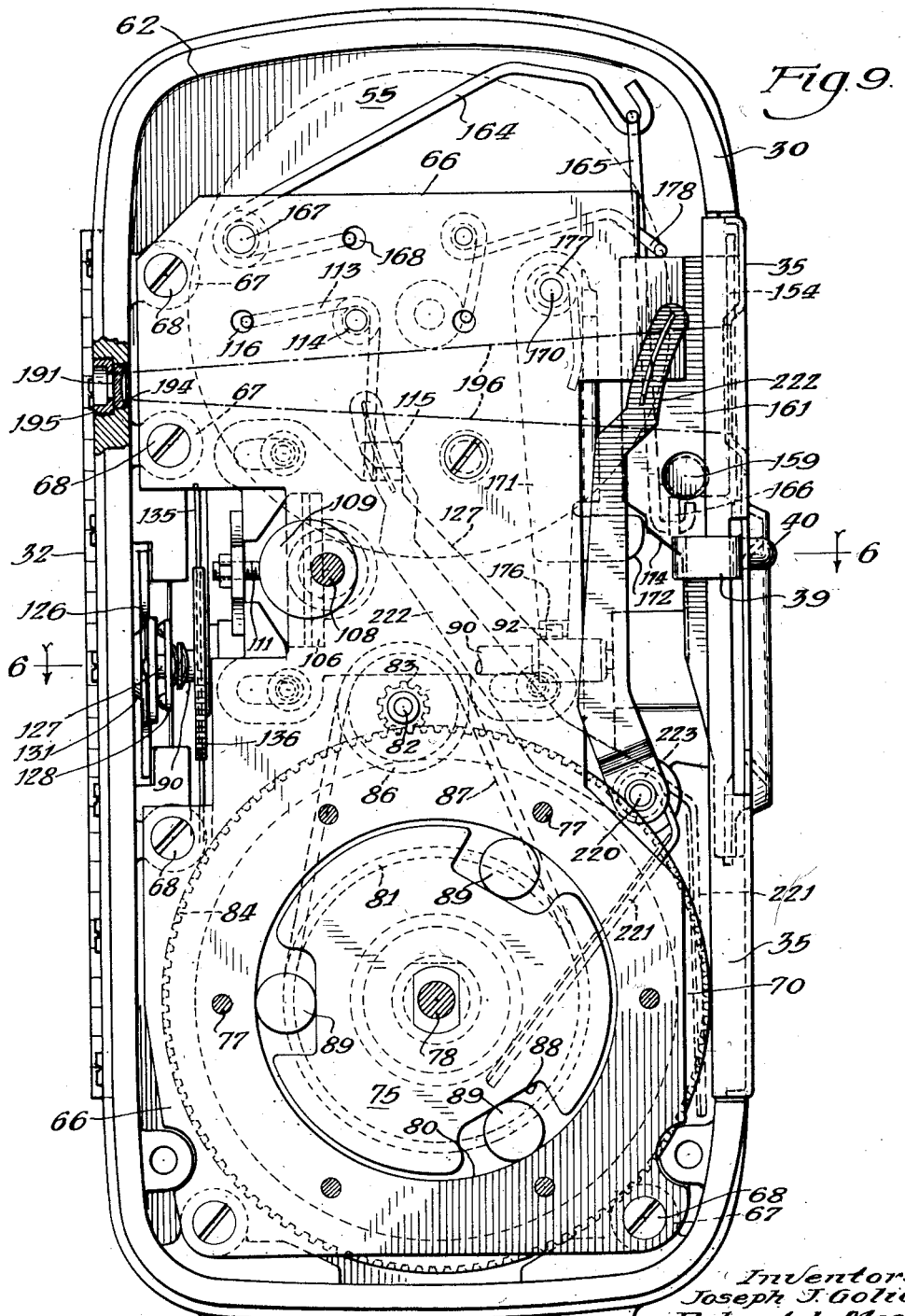

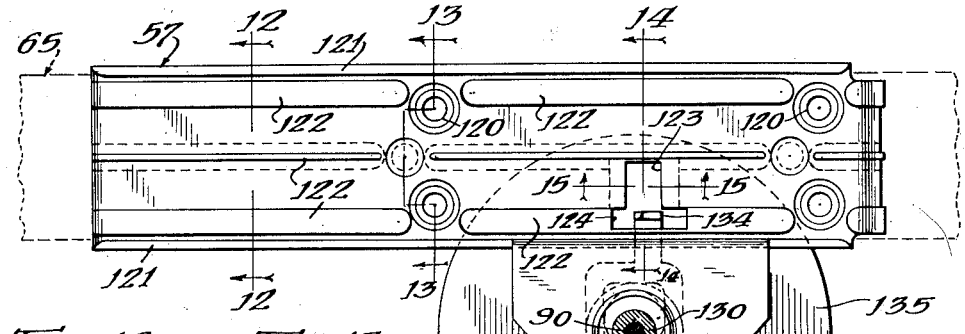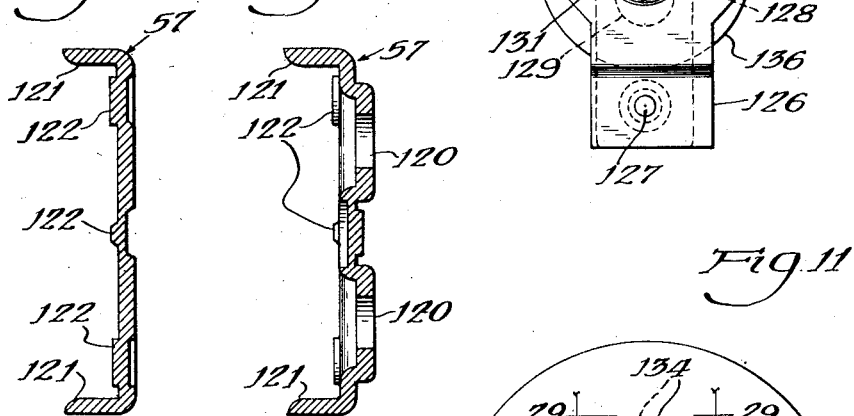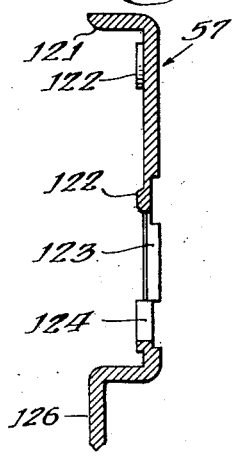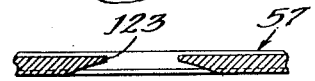

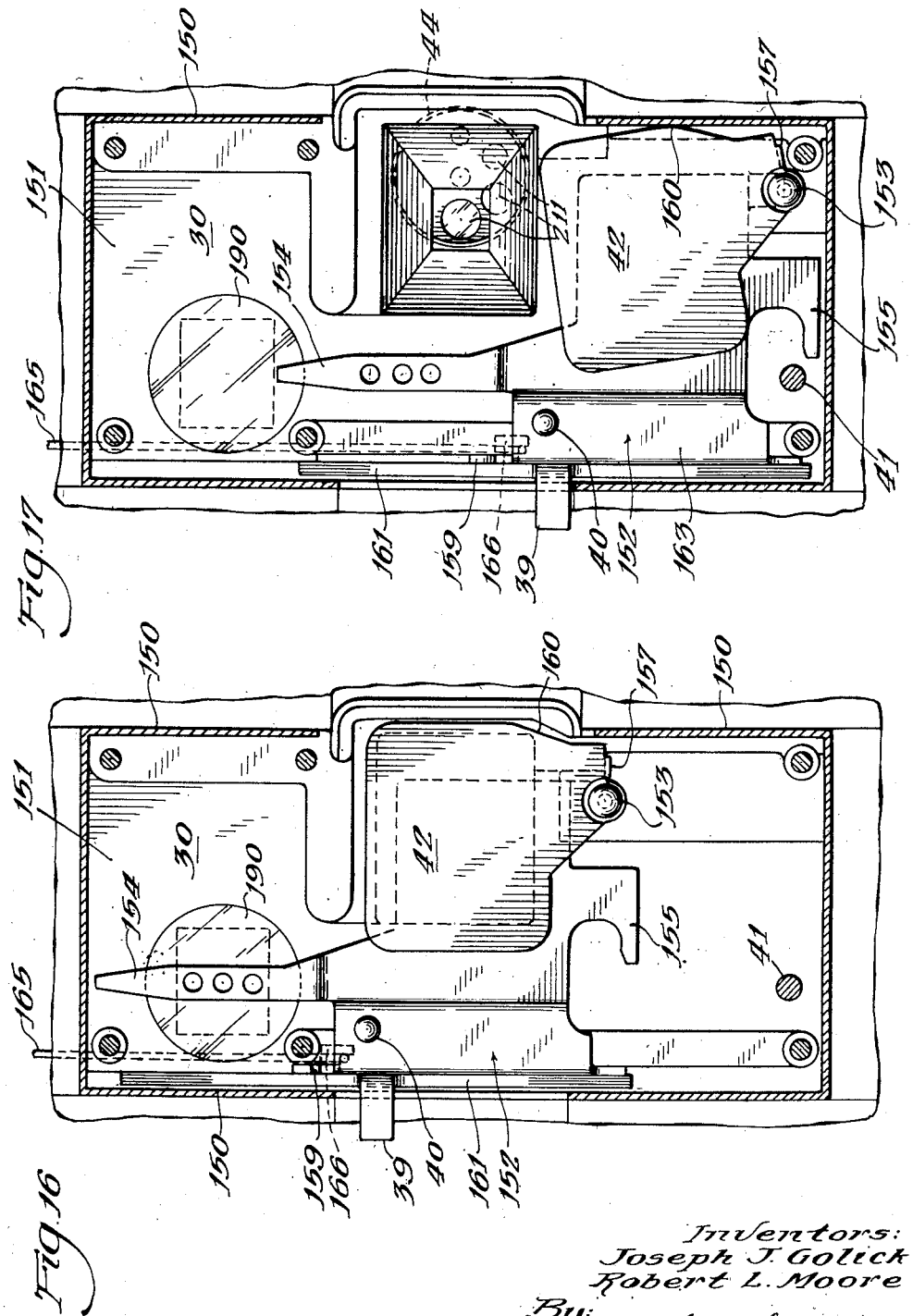

Jan. 14, 1958  J. J. GOLICK ET AL  2,819,647
MOTION PICTURE CAMERA
Filed Dec. 2, 1949  12 Sheets-Sheet 8
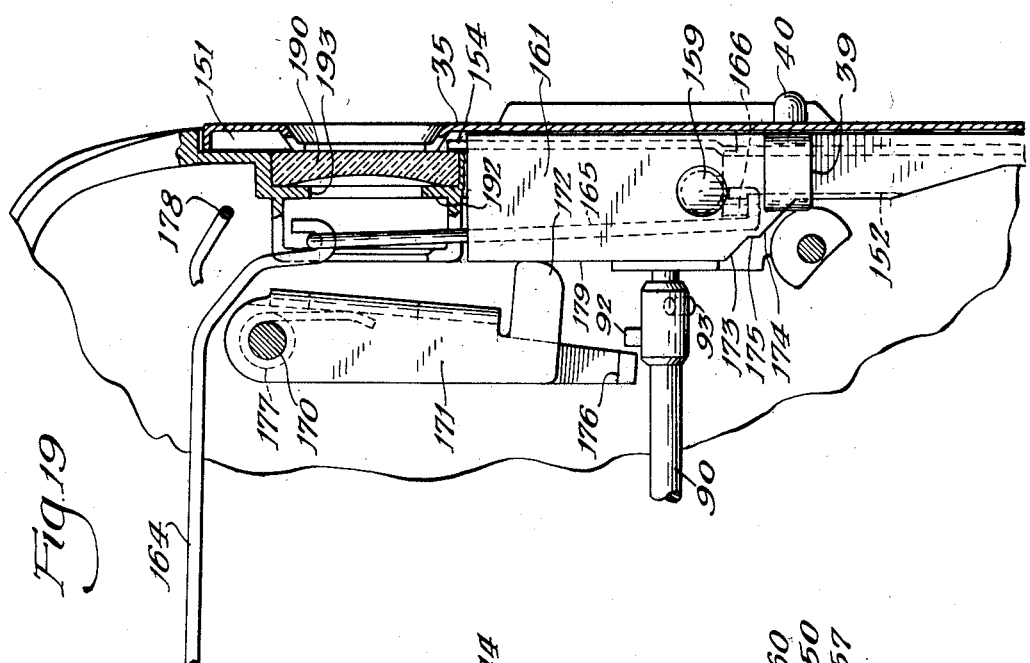
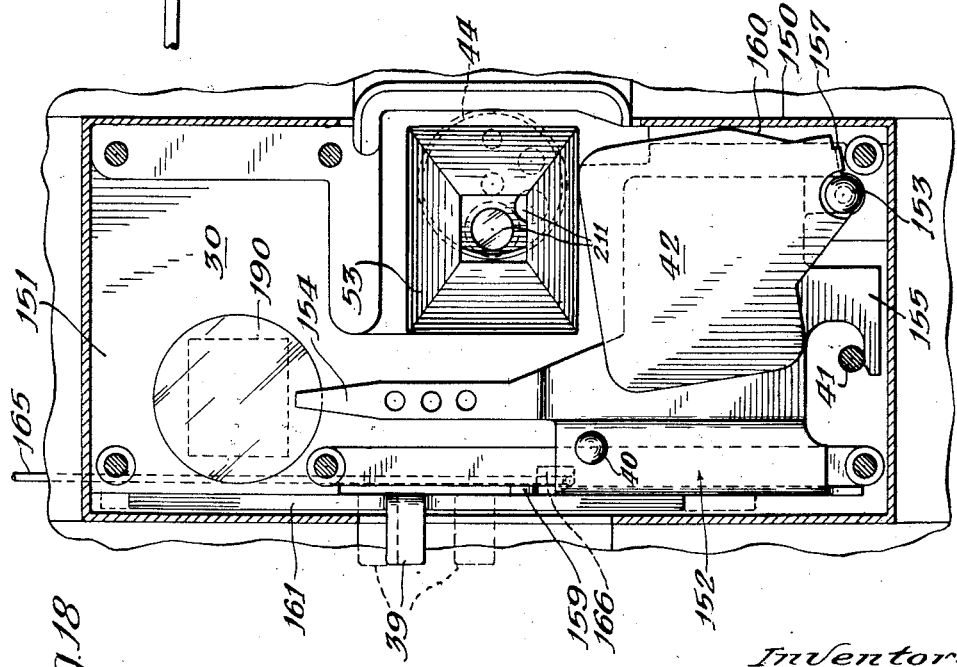
Inventors:
Joseph J. Golick
Robert L. Moore
By Zahl & Gritzbaugh
Attorneys Jan. 14, 1958　　J. J. GOLICK ET AL　　2,819,647
MOTION PICTURE CAMERA
Filed Dec. 2, 1949　　12 Sheets-Sheet 9
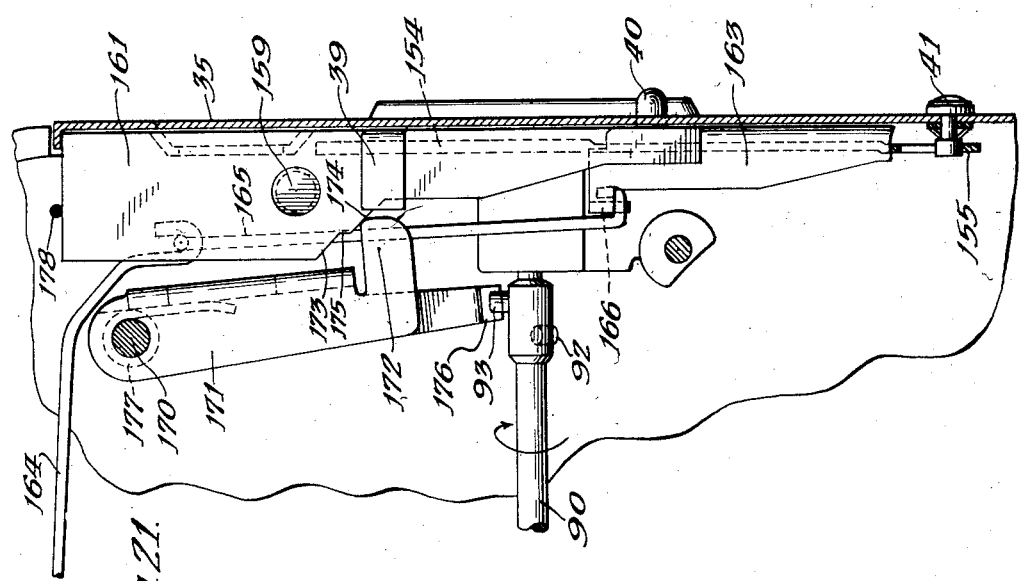
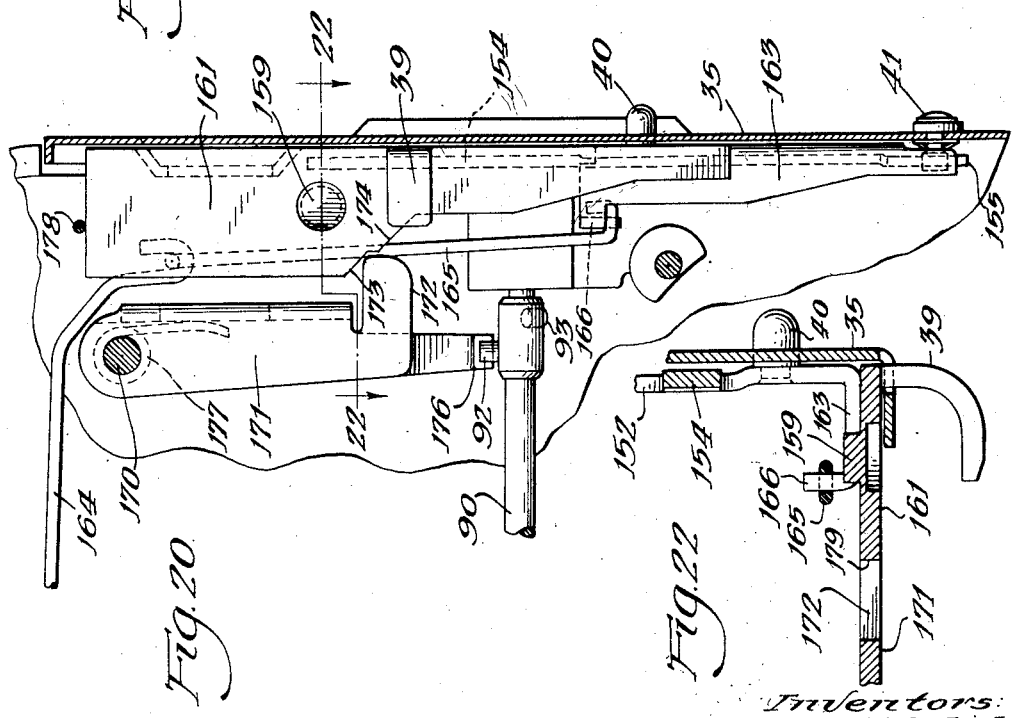
Inventors:
Joseph J. Golick
Robert L. Moore
By: Zabel & Gutbaugh
Attorneys Jan. 14, 1958  J. J. GOLICK ET AL  2,819,647
MOTION PICTURE CAMERA
Filed Dec. 2, 1949  12 Sheets-Sheet 10

Inventors:
Joseph J. Golick
Robert L. Moore
By: Zabel & Gritzbaugh
Attorneys

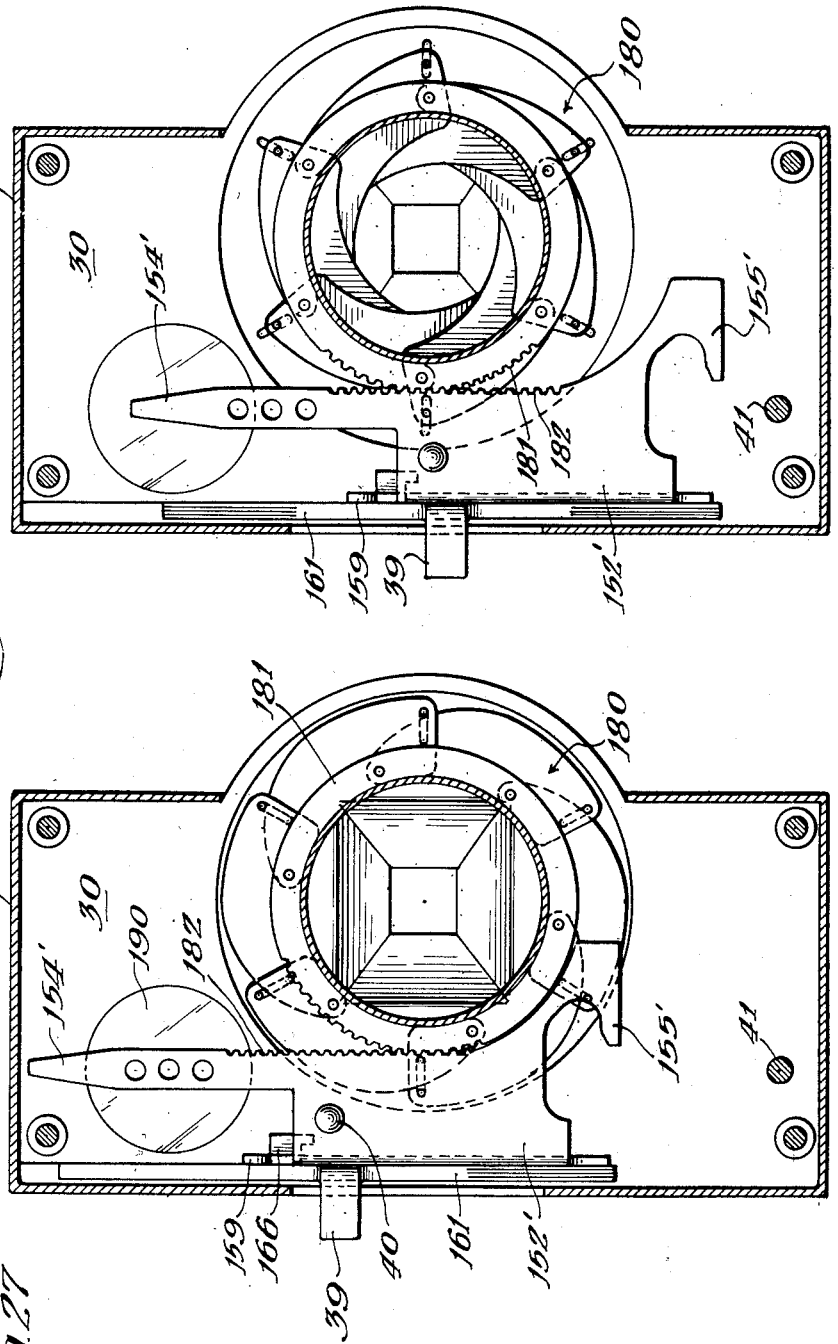

Jan. 14, 1958   J. J. GOLICK ET AL   2,819,647
MOTION PICTURE CAMERA
Filed Dec. 2, 1949   12 Sheets-Sheet 12

Inventors:
Joseph J. Golick
Robert L. Moore
By: Zabel & Gritzbaugh
Attorneys

United States Patent Office 2,819,647
Patented Jan. 14, 1958

2,819,647

MOTION PICTURE CAMERA

Joseph J. Golick and Robert L. Moore, Chicago, Ill., assignors to Revere Camera Company, Chicago, Ill., a corporation of Delaware Application December 2, 1949, Serial No. 130,752

8 Claims. (Cl. 88—17)

This invention relates to improvements in motion picture cameras.

It is an object of the present invention to provide a camera which is easier to load, and in this connection, a construction is provided in which the usual film loops and film sprocket are eliminated.

Another object is to provide for a motion picture camera, an improved gate construction which permits the film to be threaded into the gate without edgewise displacement of the film.

Still another object is to provide a camera having a minimum number of projecting parts, thereby permitting the camera to be placed in the operator's pocket, and otherwise facilitating the handling and storage thereof. In particular, a construction is provided in which the lens and the view finder are built into the body of the camera, instead of projecting therefrom as has been the current practice.

A further object is to provide a camera having a solid body member, such as a die casting or the like, thereby permitting the lens and other elements to be located in bores formed in the body member or in bushings which are pressed into the body member. It has been found that this type of construction permits the parts to be located with greater accuracy than is the present practice with respect to the usual box-like construction.

Still another object is to provide a camera in which the lens is set back into the body member at a substantial distance from the surface thereby providing a guard and a sunshade for the lens. In this connection, there is provided a built-in lens cover which protects the lens against damage and keeps it clean, thereby affording greater latitude in the handling of the camera. Furthermore, the lens cover is constructed in such a manner that it can be utilized to give a white or fade out effect.

Still further objects are to provide a camera having an improved film drive, an improved footage indicator, an improved gate and film guide construction, and various other features and advantages which will become apparent as the description proceeds.

With reference now to the drawings in which like reference numerals designate like parts:

Fig. 1 is a front view of a preferred embodiment of this invention;

Fig. 2 is a right side elevation;

Fig. 3 is a left side elevation;

Fig. 4 is a rear elevation;

Fig. 5 is a vertical section taken along lines 5—5 of Figs. 2 and 3;

Fig. 7 is an enlarged right side elevation but showing the cover partially broken away and removed, and partially in section;

Fig. 8 is a detailed section taken along line 8—8 of Fig. 7;

Fig. 9 is an enlarged left side elevation but with the wall plate removed;

Fig. 10 is a detailed section along line 10—10 of Fig. 6 showing the combined aperture plate and film guide;

Fig. 11 is a section taken along line 11—11 of Fig. 10 showing the shutter;

Fig. 12 is a section taken along line 12—12 of Fig. 10;

Fig. 13 is a section taken along line 13—13 of Fig. 10;

Fig. 14 is a section taken along line 14—14 of Fig. 10;

Fig. 15 is a section taken along line 15—15 of Fig. 10;

Fig. 16 is a vertical section taken substantially along line 16—16 of Fig. 2 showing in elevation the parts underlying the front plate of the camera, the lens cover being shown in closed position which position corresponds to the position shown in Fig. 9;

Fig. 17 is a view similar to Fig. 16 but showing the lens cover and the trigger in open position;

Fig. 18 is a view similar to Figs. 16 and 17 but showing the lens cover locked in open position and the trigger in closed position;

Fig. 19 is a left side elevation similar to Fig. 9, but partly in section and showing the parts in the Fig. 17 position;

Fig. 20 is a view similar to Fig. 19 but showing the parts in the Fig. 18 position;

Fig. 21 is a view similar to Fig. 20, but showing the trigger in the single frame exposure position;

Fig. 22 is a detailed section taken along line 22—22 of Fig. 20;

Figs. 27 and 28 are views similar to Figs. 16 and 17 respectively, but showing a modified form of lens cover in open and partially closed positions, respectively;

Fig. 29 is an enlarged detail view taken along line 29—29 of Fig. 11, and

*General organization*

Figure 6:
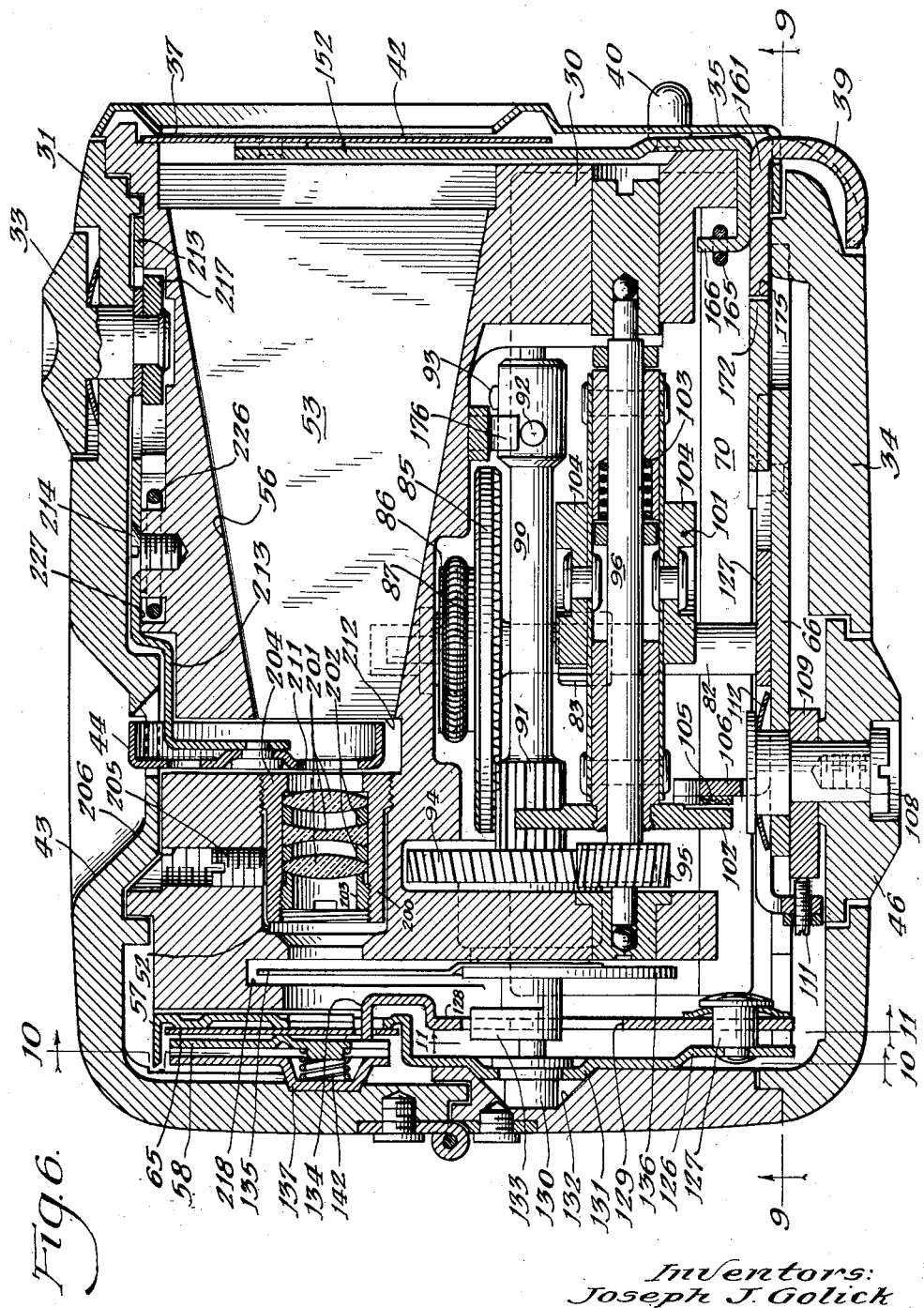
Fig. 6 is a horizontal section taken along lines 6—6 of Figs. 3 and 9.

The camera comprises a body member 30 and a cover 31 for the right side, the cover being secured to the body member by a hinge 32. Thus, the hinge cover 31 can be opened for film loading purposes. It is held in closed position by a latch 33.

The left side of the camera includes a wall plate 34 which is secured to the body member by suitable means, such as screws, not shown. A front plate 35 is secured to the front surface of the body member by means of screws 36. The front plate is provided with a lens opening 37 and a view finder opening 38. A trigger 39 is slidably disposed adjacent the front plate for controlling the operation of the motor. Projecting through the front plate are a cover control knob 40 and a cover lock button 41 which control the operation of a lens cover 42 which is mounted just behind the front plate 35.

The hinged cover 31 is recessed and apertured as indicated by the reference numeral 43 to accommodate a rotatable aperture control member 44, as shown in Figs. 2 and 6.

The wall plate 34 is provided with a footage indicator 45, a speed control member 46, and with a winding key 47 for the motor.

As shown in Figs. 5 and 6 the body member 30 is in the form of a solid block, such as a die casting or the like, in which block are formed various bores or openings which serve to determine the location of the various elements of the camera, and the body member is otherwise recessed or cut away to accommodate said elements. In general, the left half of the body member is recessed to accommodate the motor 48 and its associated parts. The right half is cut away at its upper and lower portions to provide a recess for the accommodation of a take-up spool 49 and a supply spool 50.

A pre-assembled lens unit 51 is disposed in a bore 52 formed in the body member at a point midway between the spools 49 and 50. A tapering opening 53 having a rectangular cross section is formed in the body member and extends between the lens unit 51 and the lens opening 37.

Thus, the body member 30 includes web portions 54 and 55 which separate the spool compartments 60 and 61 from the compartment 62. Between the two spool compartments, the body portion is in the form of a boss 56, the outer surface of which is more or less flush with the spools. This boss is continued around and forms the front wall of the two film compartments and a portion of the bottom and top portions, respectively, of the compartments 60 and 61. These wall portions are designated by the reference numerals 63 and 64. It will be observed that these wall portions terminate somewhat short of the line connecting the centers of the two spools; thus, when the cover 31 is swung open, the film space, that is, the space between the wall and the spools, is accessible to the operator's fingers.

On the rear surface of the boss 56 as shown in Figs. 6 and 7, is secured a combination aperture plate and film guide 57 which, together with a pressure plate 58 which is mounted on the cover 31, forms a film gate designated generally by the reference numeral 59.

The opening of the cover automatically opens the film gate so that the film 65 may be laid over the combination aperture and film guide 57, and the free end thereof engaged with the take-up spool 49 without any edgewise displacement of the film. This is due, in part, to the fact that the cover 31 forms a portion of the rear wall and of the bottom and top walls, respectively, of the film compartments 60 and 61 so that when the cover is swung open all parts of the film path are accessible to the operator's fingers.

The motor compartment 62 is partially enclosed by a plate 66 which is spaced from the web portions 54 and 55 by means of suitable pillars 67. The plate is secured to the pillars by screws 68.

Motor

The motor 48 comprises the usual spring housing 70 which is rotatably mounted on a spring hub 71, the two being connected to each other through a clock spring 72 as shown in Fig. 5. The hub 71 is provided with an axial extension in the form of a shaft 73. The hub and shaft are journalled in a bushing 74 which is pressed into the web portion 54. Additional support is provided by the cooperation of a clutch disk 75 with annular plates 76. The latter may be secured to opposite sides of the plate 66 by rivets 77. The clutch disk 75 may be staked to the hub 71. The key 47 is connected to the hub 71 by a key hub 78 which is screwed into the spring hub 71. The usual hinged connection between the winding key 47 and the key hub 78 is provided so that the key may be folded back into flush position.

The spindle 79 over which the spool 49 fits is in the form of a sleeve which is rotatably journalled on the shaft 73. A grooved pulley 81 is staked to the sleeve 79, and the latter is driven from a countershaft 82 which is journaled in suitable bushings located in plate 66 and body portion 30. A pinion 83 on the countershaft meshes with teeth 84 which are suitably formed in the peripheral wall of the spring housing 70 in order that the countershaft may be driven by the rotation of the spring housing. A face gear 85 is also mounted on the countershaft 82 and is provided with a pulley groove 86. A spring belt 87 engages the pulley groove 86 and the pulley 81 so that the spindle 79 may be driven from the countershaft.

This driving arrangement permits the introduction of a slippage which is occasioned by the varying effective diameter of the take-up spool, the slippage occurring between the spring belt and the pulleys.

As shown in Fig. 9, the plate 66 is formed with a circular opening 80 which receives the clutch disk 75. The latter is provided with notches 88, in which notches are disposed disk like clutch rollers 89. The rollers cooperate in the usual manner with the edge of the opening 80 and with the notched edge of the clutch disk 75 to prevent the unwinding of the spring hub 71.

The operation of the motor is controlled by means which includes a control shaft 90 which is also shown in Figs. 5 and 6. The control shaft is journalled in suitable bushings. The intermediate portion of the control shaft is provided with a pinion 91 which meshes with and is driven from the face gear 85. The front end of the control shaft is provided with stop pins 92 and 93 which project radially from an enlarged portion of the control shaft and are adapted to be engaged by suitable means hereinafter described for turning the motor on and off.

A gear 94 mounted on the control shaft 90 adjacent the pinion 91 meshes with a pinion 95 on a governor shaft 96. The latter is journalled in suitable high speed thrust bushings 97 and 98 which are fitted into portions 99 and 100 of the body member 30, which portions extend into the motor compartment 62.

A suitable governor designated generally by the reference numeral 101 is carried by the governor shaft 96. The governor includes a brake disk 102 which is adapted to be drawn forwardly against the bias of a spring 103 when the weights 104 are thrown outwardly.

A brake shoe 105 is carried on a lug 106 which projects inwardly from a slide 107, the slide being suitably mounted on the interior surface of plate 66, as shown in Figs. 6 and 9. A shaft 108, journalled in plate 66 carries an eccentric 109 which controls the position of the slide 107 and the brake shoe 105. The slide is provided with an outwardly bent lug which carries an adjusting screw 111. In the position of the eccentric which is shown in Figs. 6 and 9, the brake shoe 105 is at the extreme limit of its throw, thereby cooperating with the brake disk 102 to provide a relatively slow speed, which may be the normal speed of 16 frames per second, or something less. As the eccentric is rotated away from the position shown, the brake disk will permit an increase in the motor speed. The position of the eccentric and hence the motor speed, is regulated by the speed control member 46 which is suitably secured to the shaft 108 and which projects through a suitable opening in the wall plate 34. A friction spider 112 serves to retain the elements frictionally in their adjusted position. The eccentric works against the bias of a spring 113, shown in Fig. 9, which is wrapped around a suitable post 114 which depends from the plate 66. One end of the spring 133 engages a lug 115 formed on the slide 107, and the other end is anchored in a suitable aperture 116 in plate 66. Thus, the spring 113 provides means for urging the slide toward high speed position.

Gate construction

The film gate 59 comprises the combination aperture plate and film guide 57, which is secured to the vertical rear surface of boss 56 by screws 120 and the pressure plate 58 which is resiliently mounted on the cover 31.

The aperture plate 57 is provided with side guides 121 which engage the edges of the film and maintain it in proper alignment. The plate is also provided with embossed runners 122 so that the central portions of the two halves of the film will be spaced from the surface of the aperture plate. The aperture plate is also provided with an exposure aperture 123, through which the image is projected on to the film, and with a longitudinally disposed claw slot 124 which communicates therewith. As shown in Fig. 15, the forward surface of the aperture plate is ground down adjacent the edges of the aperture 123, so as to more sharply define the frame.

The aperture plate is also provided with an extension 126 which extends downwardly as shown in Fig. 10. The lower end of the extension carries a pivot 127 which is in the form of a shoulder rivet. A claw lever 128 is pivotally mounted on the pivot as shown in Figs. 6, 10 and 11. The claw lever is provided with a slot 129 by means of which it may be oscillated.

The rear end of control shaft 90 is journaled in a bushing 130 pressed into an embossed portion 131 of the extension 126, which embossed portion interlocks in a recess 132 formed in the body portion. Thus, a firm mounting is provided for the bushing. An eccentric 133 is mounted on the control shaft 90 and engages the walls of slot 129, so as to cause oscillation of the claw lever.

The claw lever terminates in a claw 134 which is cammed as shown in Fig. 29. Thus, the claw will cam itself out of the apertures in the film. To this end, the claw lever is loosely mounted on the pivot 127 so that it will wobble back and forth.

A shutter 135 and counterweight 136 are also mounted on the control shaft 90. Thus, the light path is interrupted as the film is moved from right to left, as shown in Fig. 10, in the usual manner. The return motion of the claw does not disturb the position of the film, since the claw is cammed out of the aperture.

As shown in Figs. 6 and 7, an elongate film guide 137 is secured to the rear wall of the cover 31 by means of screws 138. The film guide is recessed at 139 to accommodate the pressure plate 58. The latter is loosely mounted on the film guide 137 by means of shoulder rivets 141, and a suitable spring 142 urges the pressure plate against the aperture plate, or against the film which overlies the same. It will be observed that the film guide 137 and the pressure plate 58 are entirely received within the flanged side guides 121 so that the film is confined and constrained to move in a perfectly straight path. The film is easily threaded through the gate merely by opening the cover, which exposes all of the film path.

A snubber roller 143 is mounted just below the film gate as shown in Figs. 7 and 8 and cooperates with the pressure plate to produce sufficient resistance to the motion of the film as to cause slippage of the spring belt 87 which drives the take-up spool 49. As shown in Fig. 8, the snubber roller 143 is made in two parts so that the central portion of the film will not be damaged. The snubber roller is also provided with serrations 144 and is preferably made of rubber to increase its snubbing action.

The supply spool 50 is mounted on a stationary spindle which, as shown in Fig. 5, is secured to the web portion 55. The spindle 79 is provided with suitable teeth 146 which interlock with the take-up spool in driving relationship. The particular shape of the spindle 79 and 145 and the shape of the openings in the spools 49 and 50, which are interchangeable with each other, are standard and form no part of this invention.

*Lens cover and trigger*

The construction of the lens cover and the trigger which controls both the motor and the position of the lens cover, is shown in Figs. 16 to 26 inclusive. The lens cover and its associated mechanism is located in a space 151 between the front plate 35 and the front surface of the body member 30. The front plate is provided with flanges 150 to maintain the spaced relationship.

Figure 23:
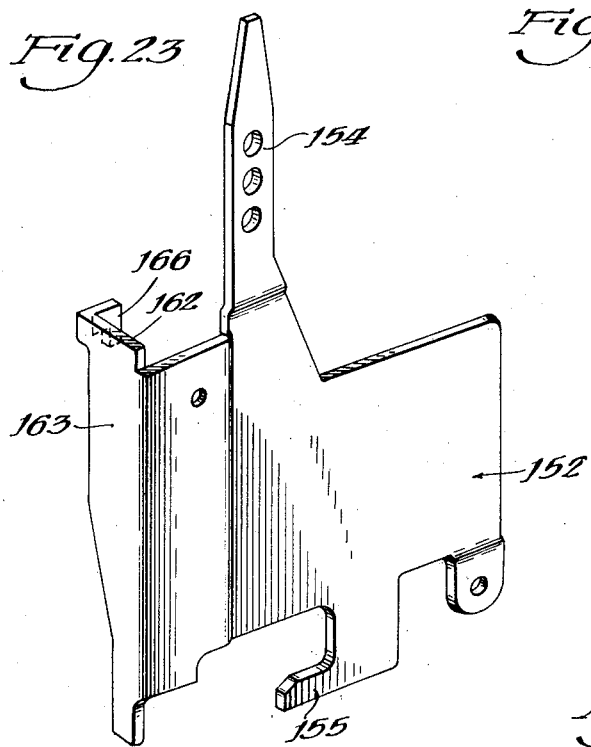
Fig. 23 is a view showing the lens cover actuating member.
Figure 24:
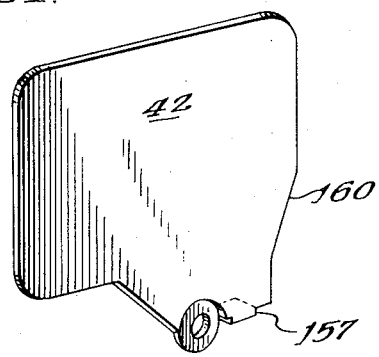
Fig. 24 is a view showing the lens cover.

A cover actuating member 152 is slidably mounted in the space 151. As shown in Fig. 23, the member 152 is provided with means such as an aperture for mounting a pivot pin 153, an upwardly extending arm which forms a signal 154, a locking lug 155, and means for mounting the cover control knob 40. The latter extends through a suitable slot formed in the front plate as shown in Fig. 1.

The lens cover 42 is pivotally mounted on the pivot pin 153 as shown in Figs. 16 to 18. It is biased in the clockwise direction by a suitable coil spring, not shown, which engages a lug 157 which extends rearwardly from the lower edge of lens cover 42, the other end of the spring being suitably anchored on the edge of member 152.

As shown in Fig. 1, the front plate 35 provides a frame for the lens opening 37, the frame extending to the right of the flange 150, and the flange 150 being interrupted at this point.

When in closed position the right hand edge of the lens cover 42 extends beyond the line of the interrupted flange 150 to completely cover the lens opening. When the actuating member 152 is pushed downwardly, the lens cover is rotated in the counterclockwise direction, as shown in Fig. 17, due to the engagement of the cam surface 160 with the flange 150, the cam surface being formed on the right edge of the lens cover. Similarly, when the cover control knob is pushed upwardly, the lens cover will rotate into its closed position as shown in Fig. 16.

Figure 25:
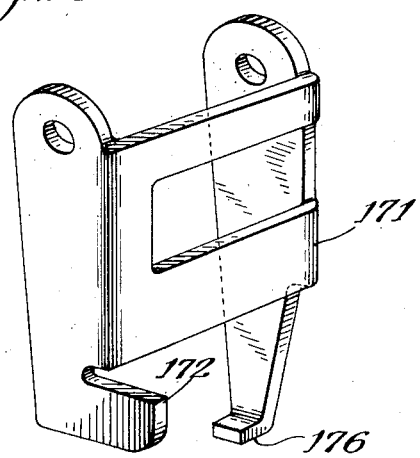
Fig. 25 is a view of the motor control yoke.
Figure 26:
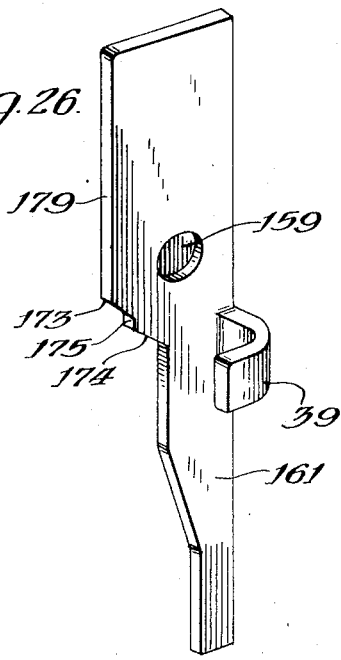
Fig. 26 is a view of the trigger plate.

The cover lock button 41 is slidably mounted in the front plate 35 and engages the locking lug 155 to retain the cover actuating member 152 and the lens cover 42 in open position. The position of the plate 152 is also controlled by the trigger 39 which projects from a trigger plate 161 as shown in Fig. 26. The latter is provided with an extrusion 159 which engages the upper edge 162 of a bent back portion 163 of the cover actuating member 152. Thus, depression of the trigger to turn on the motor will also uncover the lens. The member 152 is biased upwardly into closed position by means of a spring 164 shown in Fig. 9 which is connected by a link 165 to a hook 166 formed on the actuating member 152. The spring 164 is wrapped around a suitable rivet 167 and its free end is anchored in an aperture 168 in plate 66. A pillar 170, as shown in Fig. 5 is mounted in the plate 66 and the web portion 55. A motor control yoke 171 is pivotally mounted on said pillar and includes a laterally projecting arm 172, as shown in Fig. 25. This arm is engaged by the edge of the trigger plate 161, which edge is provided with an operating cam surface 173 and a single frame cam surface 174 which are separated by a dwell 175. The yoke 171 is also provided with a blocking lug 176 which is adapted to be swung into the paths of pins 92 and 93 which project radially from the control shaft 90. A spring 177 surrounding pillar 170 biases the motor control yoke 171 against the trigger plate.

When the camera is not being used, the trigger is in its off position as shown in Figs. 9 and 16. In this position the arm 172 rests on the dwell 175, and the blocking lug 176 extends into the path of the pin 92, and the motor is thereby prevented from operating. In this position of the parts, the lens are covered by cover 42.

When it is desired to take pictures, the trigger is pushed downwardly into positions shown in Figs. 17 and 19. This causes the cover actuating member 152 to be displaced downwardly, thereby uncovering the lens. At the same time, the operating cam surface 173 rocks the yoke in the clockwise direction and into the Fig. 19 position in which the blocking lug clears both of the pins. Thus, the motor is free to run. It will be observed that a dwell surface 179 of considerable length is provided to permit the substantial throw of the trigger which is necessary to completely uncover the lens.

If desired, the lens cover may be locked in open position as shown in Figs. 18 and 20, the trigger in these figures being in off position.

When it is desired to make a single frame exposure, the trigger is pushed upwardly into the single frame position indicated in Fig. 18 and shown in Fig. 21. Here the single frame cam surface 174 permits the rotation of the yoke in the counterclockwise direction into the position shown in Fig. 21 in which the blocking lug 176 extends into the path of pin 93. The timing of the machine is such with respect to the location of pins 92 and 93 that the movement of the trigger into single frame position will permit rotation of the control rod through somewhat more than 180°, during which portion of the cycle, the shutter 135 is withdrawn from the path of the light beam and again interrupts the same so that a single exposure is made. When the trigger is again released and permitted to return to the off position, the shutter and associated parts are restored to their normal position. A spring 178 bears against the top edge of the trigger plate to effect the return to off position.

When the lens cover is closed, the signal 154 is visible in the view finder. When the trigger is slowly moved to running position, the motor is turned on almost immediately, but the lens cover is opened slowly, thus providing a wipe or fade in effect. Where the wipe is not desired, the trigger can be moved rapidly so that only one or more frames are partially broken by the lens cover. The signal 154 is apertured so that the operator can determine the extent of the uncover of the lens thereby providing a steady and uniform wipe.

A modified form of lens cover is shown in Figs. 27 and 28 which produces a circular wipe. In this modification, an iris 180 is substituted for the lens cover 42. The iris is of the usual construction and includes an operating gear 181 which is formed on the cover actuating member 152'. Otherwise, the construction is substantially identical to that shown in Figs. 16 to 26. A rack 182 formed on member 152' operates the iris cover 180.

Figure 30:
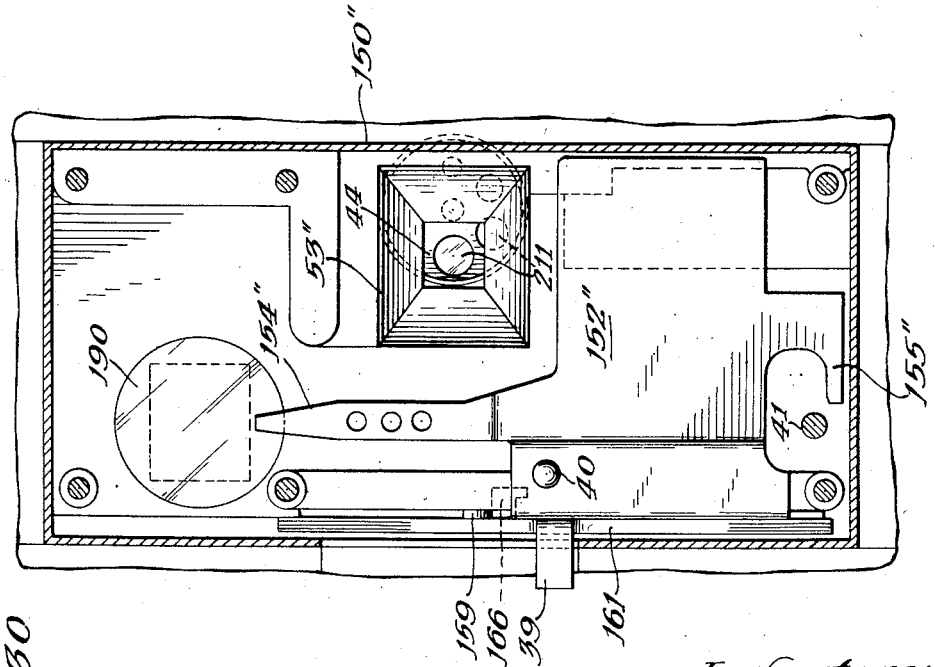

As a further modification, the position of the tapering bore 53 with respect to the flange 150 of front plate 35 would be shifted to permit complete coverage of the lens opening by the member 152, as shown in Fig. 30.

Mounting of optical elements

The view finder comprises a field lens 190 shown in Fig. 19 and an eye piece 191 shown in Fig. 9, both lenses being seated in the body member 30 so that the spacing between them will remain constant.

As shown in Fig. 19, the body member is recessed to provide a seat 192 for the field lens. The seat is provided with a rectangular aperture 193 which serves to frame the view. The front plate 35 serves to retain the field lens in its seat.

Similarly, the rear surface of the body member is recessed to provide a seat 194 for the eye piece, and a retainer 195 maintains the eye in its seat.

The field lens and eye piece are axially aligned, and the light beam passes through an unobstructed portion of the motor compartment 62 as indicated by the broken lines 196 in Fig. 9.

The lens unit 51, as shown in Fig. 6, comprises a sleeve 200 in which the several elements 201 are maintained in spaced relationship by means of spacers 202 and retainer 203. The retainer is threaded into the sleeve. The front portion of the bore 52 is threaded so as to engage threads 204 formed on the sleeve 200. Thus the focus can be adjusted by rotating the lens unit. A set screw 205 in bore 206 holds the lens unit in its adjusted position. This construction provides sharper pictures since there is no problem of cumulative tolerances as is found in most fixed focus cameras where the focal distance is determined by the abutment of machined portions of the lens unit and of the housing.

The aperture, or focal ratio, is regulated by the aperture control member 44 which is in the form of a flanged disk having a series of perforations 211 therein. The control member 44 is disposed in a slot 212 formed in the body member 30, and it is rotatably mounted on a bracket 213 which is secured to the right side surface of the body member by screws 214. The outer flanged portion of the control member 44 is provided with indicia 215, as shown in Fig. 7. Suitable detent means, not shown, may be provided to retain the member 44 in any one of its various operative positions.

The bracket 213 is provided with a non-circular opening 216, as shown in Fig. 7, which is adapted to receive a locking key 217 which is secured to the latch 33 and rotates therewith, in order that the cover 31 may be locked in closed position. The bracket and control member may be readily removed to permit access to the lens unit for adjustment or replacement. The lens unit can thus be removed through the tapering opening 53. As shown in Fig. 6 the body member is slotted at 218 to accommodate the shutter 135.

Footage indicator

The footage indicator is shown in Figs. 5, 6, 7 and 9 and is designed so that it automatically re-sets itself to zero each time the camera is loaded. The footage indicator comprises a shaft 220 which is rotatably mounted in the web portion 54. One end of the shaft thus extends into the spool compartment 60, to which end is secured a film engaging arm 221, and the opposite end of the shaft is disposed in the motor compartment 62, to which end is secured an indicator 222. A spring 223 biases the shaft and arms in the counterclockwise direction as shown in Fig. 7 so that the arm 221 will engage the film that is wound on the take-up spool 49. The footage indicator 45 is in the form of a slotted plate disposed in an opening 224 in the wall plate 34, and is provided with a scale 225 which indicates in feet the amount of film that has been wound on the take-up spool. The indicator arm 22 is exposed to view through the slot in the plate 45.

The fact that the point of contact between the arm 221 and the film moves inwardly toward the shaft as the wound film increases in diameter, together with the angular disposition of the end of the indicator arm 222 with respect to the slot compensates in part for the increase in the diameter of the film which is wound on the take-up spool. Thus, the scale 225 can be calibrated approximately linearly.

Means are provided to withdraw the arm 221 from between the flanges of the take-up spool automatically as the cover 31 is opened, thereby permitting removal of the spool. Such means includes a U-shaped wire spring 226 which is disposed in a recess or groove 227 formed in the surface of the body member 30 and surrounding screw 214. The spring is confined in said groove under tension. One arm 228 of the spring is longer than the other, and engages the film engaging arm 221 to urge it clear of the take-up spool. An intermediate portion of the arm 228 is engaged by the locking key 217 which serves as a cam to displace the spring arm 228 out of engagement with the arm 221, thereby permitting operation of the latter. Fig. 7 indicates the operative position of arm 221 in solid lines, and its inoperative position in dotted lines. In the former position, the spring arm 228 is displaced when the locking key is in cover locked position. Opening of the cover necessarily involves rotation of the key to a position which causes the spring arm 228 to assume its dotted line position.

Thus, the use of this type of footage indicator, which automatically re-sets itself, does not interfere with the loading of the camera. Furthermore, after the film has been entirely wound on the take-up spool, the film engaging arm 221 prevents that flapping of the free end which oftentimes relaxes the tension with which the film has been wound on the spool.

Operation

The operation of the camera has been heretofore described in detail in connection with the description of the various parts thereof; the operation of the device as a whole will now be summarized.

To load the camera, the latch 33 is turned and the hinged cover 31 swung to open position. The empty spool, which is to serve as the take-up spool 49, is placed on spindle 79 in the spool compartment 60. The supply spool 50 is then placed on the stationary spindle 145 in the spool compartment 61. The leader of the film 65 is then laid over the combined aperture plate and film guide 57 and the free end thereof secured to the spool 49 as by inserting the same in the usual slot. It will be observed that this operation can be effected without moving the film edgewise since the cover 31 is hinged at a point which corresponds generally to the level or plane of the web portions 54 and 55.

The closing of the hinged cover automatically brings the pressure plate into operative position, and the rotation of the latch 33 into cover locked position releases the film engaging arm 221 so that it may engage the film and so that the indicator arm 222 is re-set to zero.

In taking the picture, the motor is wound by means of the winding key 47 in the usual manner. The object is then sighted through the view finder, and the signal 154 which overlies the field lens 190 indicates to the operator that the camera lens is covered. If a wipe is desired, the trigger 39 is slowly depressed which turns on the motor so that the camera will be operating as the lens cover 42 is being withdrawn. If a wipe is not desired, the cover is withdrawn by depressing the cover control knob 40 and locking it in retracted position by means of the cover lock button 41.

Depression of the trigger 39 displaces the motor control yoke 171 rearwardly, thus releasing the motor control shaft 90. Thereupon, the spool 49 and the claw 134 cooperate to advance the film intermittently past the exposure aperture 123. The snubber roller 143, the pressure plate 58, and the spring belt 87 cooperate to permit the film to remain stationary during the period that the light beam is interrupted by the shutter 135. The return of the trigger 39 to its "off" position causes the yoke 171 to again block the path of a pin 92 thereby stopping the motor in a position in which the shutter interrupts the light path.

To expose a single frame of the picture, the trigger 39 is lifted with the result that the yoke 171 is displaced forwardly into the path of the pin 93, thus permitting the control shaft to rotate through somewhat more than 180° so that the shutter will permit the full exposure of that single frame. Depression of the trigger back into its "off" position permits sufficient rotation of the control shaft to cause the claw 134 to advance the next frame into registry with the aperture 123.

To take slow motion pictures, the speed control member 46 is rotated to regulate the action of the governor 101.

As the film is wound up on the take-up spool 49, the assembly comprising the shaft 220, the film engaging arm 221, and the indicator arm 222 are displaced so that the amount of film that has been used will be indicated by the cooperation of the indicator arm and the slotted plate footage indicator 45.

When the film has all been exposed and the trailing end has cleared the film gate, there will be no flapping due to the action of the film engaging arm 221. When the cover 31 is opened, the rotation of the locking key 217 automatically causes the film engaging arm to be retracted from between the end members of the spool, so that the fully wound take-up spool can be readily removed.

When the present invention is used in connection with an 8 mm. camera, as shown in the particular embodiment herein illustrated, the position of the take-up and supply spools is reversed at this time in the usual manner. Otherwise, as when the invention is applied to a non-reversible camera, such as the usual 16 mm. or 35 mm. camera, the wound take-up spool is removed entirely and a fresh spool is placed on the stationary spindle 145.

The particular arrangement herein shown, provides a film path which can be characterized herein as a "tangential" path because of the fact that the film gate 59 is disposed substantially tangentially to the two spools, and the direction of film motion is in the general tangential direction with respect to the direction of spool rotation. This tangential path construction permits the lens to be set well within the body of the camera, which structural feature permits the use of additional structural features not found in cameras of this type. Such additional features are the provision of a lens cover which also serves as a wipe, the provision of an aperture control of the disk-type, the provision of an adjustable lens unit due to its screw threaded mounting in the body member of the camera, the provision of a split film gate, since the usual construction would require a hingedly mounted lens to achieve a comparable result, and the provision of a hingedly mounted rear wall for the spool compartments which permits what can be termed "flush loading" since any edgewise displacement of the film is eliminated, and the operator's fingers may lie flush with the web portion of the film compartments, thereby permitting engagement of the free end of the film with the slotted core of the take-up spool.

Furthermore, a construction has been provided which eliminates the use of the usual sprocket and film loops, thereby considerably simplifying the construction as well as making for easier loading. The resistance to the movement of the film which is provided by the snubber roller 143 and the pressure plate 58 is greater than the pull of the spring belt 87 as modified by the variation in lever arm due to the progressively increasing diameter of the film which has been wound onto the take-up spool. When the parts are designed so that this condition prevails, it has been found that the sprocket can be eliminated. Furthermore, by the use of a resilient belt, the spool is permitted to rotate with an intermittent motion which corresponds to the intermittent motion of the film as it is being advanced past the aperture plate by the claw, thus eliminating the need for film loops.

Furthermore, the invention provides an improved aperture plate assembly, shown in Figs. 10 and 11, in which the aperture plate, the film guide, and the extension 126 can be formed as an integral member, thereby providing means for mounting the control shaft bushing and the claw pivot in predetermined spaced relationship with the film path and aperture. Furthermore, the claw itself forms a part of this assembly which can be removed and replaced as a unit, thereby considerably facilitating the manufacture and repair of the camera.

The elimination of the film loops, in addition to permitting the elimination of the sprocket, provides a steadier picture since the claw does not work against the variable load or snapping tendency imposed by the flexural resilience of the film loop. Furthermore, the snubber roller is believed to modify or even out whatever load variation there may be due to the intermittent motion of the film. In this connection, the snubber roller 143 frictionally engages the stud on which it is mounted so that it is either stationary or rotates only under a comparatively heavy pull, although a more freely rotating snubber roller could be utilized under proper conditions.

Although the cover 31 is herein shown as being hingedly mounted on the body member, it could be completely separable therefrom and still carry the pressure plate 58. In the alternative, the pressure plate 58 and its supporting means 137 could be directly hinged to the body member without detracting from the "flush loading" feature of the invention. In such an arrangement, the cover 31 would be associated with the body member in such a manner that the cover when opened or removed would not interfere with the hinged movement of the pressure plate 58 and its supporting means.

The terms "longitudinal," "transverse," and "vertical" are used herein only in the relative sense, longitudinal indicating the front to back direction, and transverse, the side to side direction.

The term "exposure portion" as used herein indicates that portion of each cycle during which the film is being exposed, and the term "interrupted portion" refers to the remaining portions of each cycle during which the light beam is interrupted by the shutter.

Figure 31:
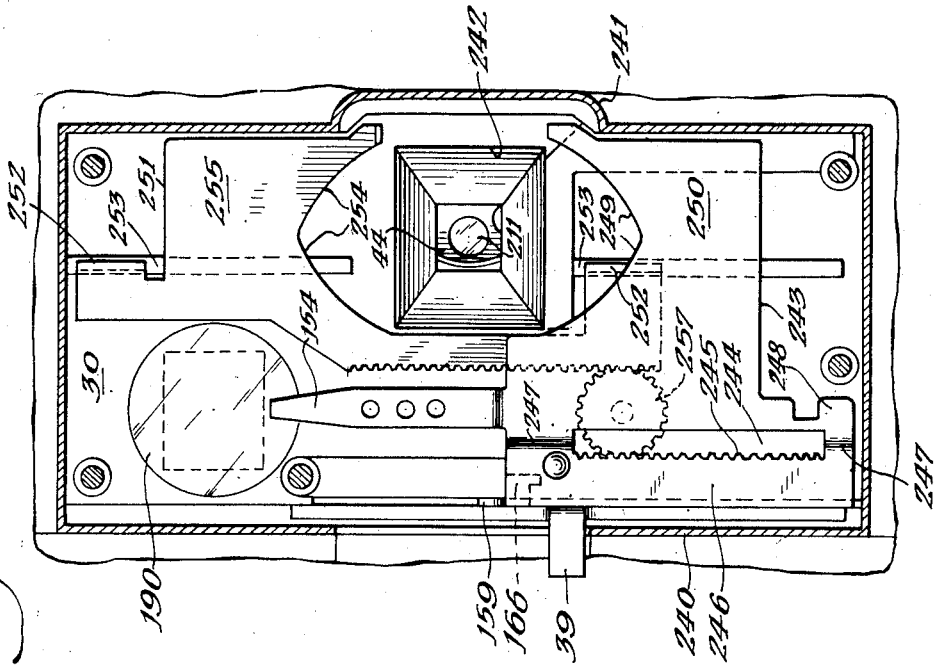
Figs. 30 and 31 are views similar to Fig. 17, but showing additional modifications of the lens cover.

A still further modification of the lens cover is shown in Fig. 31 in which the reference numeral 240 designates the flange of the front plate 35. It will be observed that the flange, at its right hand portion, is offset as indicated by the reference numeral 241. The body member 30 is provided with a lens opening 242, similar to the lens opening 37 previously described.

A slidably mounted plate 243 is confined between the front plate and the body portion and is actuated by the trigger 39, in substantially the same manner as the plate 152 previously described. The plate 243 is provided with a slot 244, on one edge of which is formed a rack 245. The portion 246 of the plate 243 which is to the left of the slot as viewed in Fig. 31, is offset rearwardly by means of bends 247. The lower portion of the plate may be notched to form a locking lug 248 which cooperates with the cover lock button 41 in the same manner as locking lug 155, except that the motion of the cover lock button 41 is reversed.

The plate 243 also includes a lens covering portion 250, the upper edge 249 of which is of generally semicircular shape.

A second slidably mounted plate 251 is disposed between the plate 243 and the front surface of the body member 30, and is guided in its sliding motion by means of the bent edges 252 which engage slots 253 formed in the body portion 30. The second plate 251 has a lens covering portion 255, the lower edge 254 of which is of generally semicircular shape and which cooperates with the edge 249 as hereinafter described. The left hand edge of the second plate 251 is provided with a rack 256 which engages a pinion 257 mounted on the body portion 30. The pinion meshes with and is driven by the rack 245 so that movement of the plate 243 will cause movement of the second plate 251 in the opposite direction.

In operation, as the trigger 39 is depressed, the plates 243 and 251 will move away from each other into the uncovered position shown in Fig. 31. When the trigger is in its off position, the cover portions 250 and 255 overlap to completely cover the lens. Thus, movement of the plates from one extreme position to the other will provide a wipe effect which simulates the circular wipe provided by the iris type of construction shown in Figs. 27 and 28.

Although only preferred embodiments of the invention have been shown and described herein, it will be understood that various modifications and changes can be made in the construction shown without departing from the spirit of the invention as defined by the appended claims.

We claim:

1. A motion picture camera comprising means for rotatably mounting a take-up spool and supply spool, means for rotating the take-up spool so that the winding up of the film thereon will cause rotation of said supply spool in the same direction, a film gate disposed substantially parallel to the plane connecting the centers of said spool mounting means and being offset to that side of said plane which permits said film to move with a substantially tangential motion with respect to the rotation of said supply spool, means disposed between said spool mounting means and intersected by said plane for providing a path for a light beam which intersects said plane, said light beam path providing means comprising a solid body member portion having a front surface disposed on the opposite side of said plane from said film gate and having a passageway extending all the way through said body member from the front surface thereof to said film gate, a lens unit disposed in said passageway rearwardly of said plane and spaced inwardly from said front surface whereby the front part of said passageway forms a guard and a sunshield for said lens, a disk rotatably disposed between said lens unit and said front surface, said disk having a plurality of openings therein adapted to register with the axis of said lens unit to regulate the aperture thereof, said body member portion being provided with a slot intersecting said passageway, and said disk being rotatably mounted in said slot, and a bracket secured to the side surface of said body member portion, said bracket comprising a plate portion overlying said side surface, and an end portion bent substantially at right angles thereto and extending into said slot, said disk being rotatably mounted on said end portion.

2. A camera according to claim 1 having a movable cover overlying said spools and said film gate, a rotatable latch member mounted on said cover and being provided with a locking key secured thereto and rotating therewith, the plate portion of said bracket being provided with an aperture adapted to receive said locking key, said locking key and said aperture being of eccentric shape so that said locking key will engage said plate portion when said latch member is turned in order to lock said cover in closed position.

3. A camera as claimed in claim 2 having a footage indicator comprising a film engaging arm rotatably mounted adjacent said take-up spool, means biasing said film engaging arm into contact with the film as it is being wound on said take-up spool, indicating means associated with said film engaging arm and rotating therewith to indicate the position of said arm, a resilient member anchored in said body member portion and having an end engaging said film engaging arm to cause displacement of the latter out of film engaging position and away from said take-up spool in order to permit removal thereof from said mounting means, and having an intermediate portion disposed adjacent said locking key and adapted to be engaged thereby whereby rotation of said locking key into cover locked position will cause displacement of said spring member away from said film engaging arm to permit the latter to move into film engaging position.

4. A motion picture camera comprising means for rotatably mounting a take-up spool and supply spool, means for rotating the take-up spool so that the winding up of the film thereon will cause rotation of said supply spool in the same direction, a film gate disposed substantially parallel to the plane connecting the centers of said spool mounting means and being offset to that side of said plane which permits said film to move with a substantially tangential motion with respect to the rotation of said supply spool, means disposed between said spool mounting means and intersected by said plane for providing a path for a light beam which intersects said plane, said light beam path providing means comprising a solid body member portion having a front surface disposed on the opposite side of said plane from said film gate and having a passageway extending all the way through said body member from the front surface thereof to said film gate, a lens unit disposed in said passageway rearwardly of said plane and spaced inwardly from said front surface whereby the front part of said passageway forms a guard and a sunshield for said lens, said film gate comprising an aperture plate secured to the rear surface of said body member portion, a claw lever pivotally mounted on said aperture plate and having a claw member for engaging the apertures of a film, said claw member having a cammed edge, and means for reciprocating said claw lever so that said claw member will advance said film through said film gate intermittently and in one direction only.

5. A motion picture camera comprising means for rotatably mounting a take-up spool and supply spool, means for rotating the take-up spool so that the winding up of the film thereon will cause rotation of said supply spool in the same direction, a film gate disposed substantially parallel to the plane connecting the centers of said spool mounting means and being offset to that side of said plane which permits said film to move with a substantially tangential motion with respect to the rotation of said supply spool, means disposed between said spool mounting means and intersected by said plane for providing a path for a light beam which intersects said plane, said light beam path providing means comprising a solid body member portion having a front surface disposed on the opposite side of said plane from said film gate and having a passageway extending all the way through said body member from the front surface thereof to said film gate, a lens unit disposed in said passageway rearwardly of said plane and spaced inwardly from said front surface whereby the front part of said passageway forms a guard and a sunshield for said lens, an integral body member of which said solid body member portion forms a part, and having vertically disposed web portions extending above and below, respectively, said body member portion, said web portions each being provided with an interrupted flange forming top and bottom spool compartments, said flanges providing front walls for said spool compartments, and contiguous top and bottom horizontal walls for said upper spool compartment and said lower spool compartment respectively, said flanges being interrupted toward the rear portions of said horizontal walls to facilitate access to said compartments, a cover for said spool compartments providing horizontal and rear walls which cooperate with said interrupted flange to completely enclose said spool compartments whereby the opening of said cover will permit the fingers of an operator to be inserted between the flanges of said spools, said spool mounting means being mounted on and projecting outwardly from said web portions, and means for hingedly mounting said cover on said housing for movement about a hinged axis which is perpendicular to the axis of said spool mounting means.

6. A camera as claimed in claim 5 in which said film gate comprises an aperture plate secured to the rear surface of said body member portion, and a pressure plate resiliently mounted on the rear wall of said cover at a point opposite said aperture plate and cooperating therewith to urge the film into contact with said aperture plate, whereby the opening of said cover exposes said aperture plate and permits the film to be threaded thereover.

7. In a motion picture camera having a motor and a lens, the combination of lens covering means comprising a displaceable control member therefor, a trigger for controlling the operation of said motor, a portion of said trigger engaging said control member to displace the same simultaneously with the turning on of said motor, and means for locking said control member in displaced position corresponding to an uncovered condition of said lens, said trigger means being thereafter freely movable to control the motor, said trigger and said control means being mounted for parallel sliding movement, and said control member always being disposed in the path of said trigger portion so that the motor cannot be operated when the lens are covered.

8. In a motion picture camera having a spool compartment, a cover therefor, latch means mounted on said cover to lock the same in closed position and means for rotatably mounting a spool in said spool compartment, the combination of a footage indicator comprising a film engaging arm movable between an operative position in which it engages the film which is wound on to said spool at a point between the flanges thereof, and an inoperative position in which said arm is clear of the flanges of said spool, thereby permitting removal of said spool from said mounting means, indicating means connected to said film engaging arm to indicate the position thereof, and means engaged by said latch means and adapted to engage said film engaging arm and to move the same into inoperative position, the operation of said last-mentioned means being controlled by the operation of said latch means into unlatched position.

References Cited in the file of this patent

UNITED STATES PATENTS

| | | |
|---|---|---|
| 691,493 | Rosenberg | Jan. 21, 1902 |
| 1,236,419 | Folmer | Aug. 14, 1917 |
| 1,270,866 | Power | July 2, 1918 |
| 1,295,081 | Tartara | Feb. 18, 1919 |
| 1,350,683 | Stringham | Aug. 24, 1920 |
| 1,455,096 | Roebuck | May 15, 1923 |
| 1,512,785 | Mittasch | Oct. 21, 1924 |
| 1,572,863 | Owens | Feb. 9, 1926 |
| 1,750,220 | Fritts | Mar. 11, 1930 |
| 1,870,464 | Ramsey | Aug. 9, 1932 |
| 1,919,513 | Hillery-Collings | July 25, 1933 |
| 1,966,556 | Mayer | July 17, 1934 |
| 1,977,569 | Hineline | Oct. 16, 1934 |
| 1,979,984 | Moomaw | Nov. 6, 1934 |
| 1,984,620 | Anderson | Dec. 18, 1934 |
| 2,000,588 | Fuerst | May 7, 1935 |
| 2,029,476 | Githens | Feb. 4, 1936 |
| 2,058,531 | Tuttle | Oct. 27, 1936 |
| 2,103,369 | Howell | Dec. 28, 1937 |
| 2,132,696 | Nagel | Oct. 11, 1938 |
| 2,208,797 | Kende | July 23, 1940 |
| 2,238,371 | Pollack | Apr. 15, 1941 |
| 2,238,482 | Wittel | Apr. 15, 1941 |
| 2,252,563 | Githens et al. | Aug. 12, 1941 |
| 2,257,424 | Meyer | Sept. 30, 1941 |
| 2,294,250 | Sperry | Aug. 25, 1942 |
| 2,319,204 | Bolsey | May 18, 1943 |
| 2,341,460 | Martin | Feb. 8, 1944 |
| 2,352,008 | Riedel | June 20, 1944 |
| 2,357,158 | Zuber | Aug. 29, 1944 |
| 2,378,406 | Harris | June 19, 1945 |
| 2,418,361 | McNabb | Apr. 1, 1947 |
| 2,419,759 | Briskin et al. | Apr. 29, 1947 |
| 2,420,628 | Stoiber | May 13, 1947 |
| 2,443,601 | Cisski | June 22, 1948 |
| 2,443,950 | Dunlavey | June 22, 1948 |
| 2,451,017 | Aldreany | Oct. 12, 1948 |
| 2,474,323 | Rattray | June 28, 1949 |

FOREIGN PATENTS

| | | |
|---|---|---|
| 563,306 | Great Britain | Aug. 9, 1944 |